United States Patent
Kim

[19]

[11] Patent Number: 5,854,826
[45] Date of Patent: Dec. 29, 1998

[54] RING VOICE MESSAGE GENERATING DEVICE AND METHOD OF AUTOMATIC ANSWERING TELEPHONE

[75] Inventor: Dong-Woo Kim, Gumi, Rep. of Korea

[73] Assignee: SamSung Electronics Co., Ltd., Suwon, Rep. of Korea

[21] Appl. No.: 635,217

[22] Filed: Apr. 15, 1996

[30] Foreign Application Priority Data

Apr. 13, 1995 [KR] Rep. of Korea ................... 1995 8697

[51] Int. Cl.⁶ .......................................................... H04M 1/64
[52] U.S. Cl. ............................. 379/68; 379/76; 379/373
[58] Field of Search .................................... 379/67, 88, 89, 379/74, 76, 373, 374

[56] References Cited

U.S. PATENT DOCUMENTS

| | | | |
|---|---|---|---|
| 4,480,153 | 10/1984 | Festa | 379/84 |
| 4,608,458 | 8/1986 | Hashimoto | 379/70 |
| 4,856,055 | 8/1989 | Schwartz | 379/374 |
| 5,099,513 | 3/1992 | Kim et al. | 379/373 |
| 5,200,994 | 4/1993 | Sasano et al. | 379/374 |
| 5,307,059 | 4/1994 | Connary et al. | 379/374 |
| 5,313,516 | 5/1994 | Afshar et al. | 379/67 |
| 5,388,150 | 2/1995 | Schneyer et al. | 379/142 |
| 5,481,599 | 1/1996 | MacAllister et al. | 379/101 |

FOREIGN PATENT DOCUMENTS

| | | | |
|---|---|---|---|
| 2193419 | 2/1988 | Germany | 379/374 |
| 0268338 | 11/1988 | Japan | 379/374 |

Primary Examiner—Fan S. Tsang
Attorney, Agent, or Firm—Robert E. Bushnell, Esq.

[57] ABSTRACT

A ring voice message generating device for use in an automatic answering telephone system including a key input unit having alphanumeric keys or other function keys, for allowing a user to set the telephone system in a voice calling mode so that, upon reception of an incoming telephone call, a personalized voice message pre-recorded is announced in lieu of a standard ring tone to inform the user of such an incoming telephone call. Otherwise, the telephone system generates a standard ring tone if the voice calling mode is not set by the user. A ring detecting unit is connected to an incoming telephone line from a central exchange for detecting an incoming telephone call. An on/off hook switch is connected to the telephone system for forming a telephone conversation path when the user picks up the telephone handset to answer the incoming telephone call. A voice storing unit is provided for storing a personalized voice message for announcing the incoming telephone call when the telephone system is set in the voice calling mode. A ring generating unit is provided for generating a standard ring tone when the telephone system is not set in the voice calling mode. A mode selecting unit is provided for allowing the user to set the telephone system in one of a voice calling mode and a standard ring mode.

18 Claims, 2 Drawing Sheets

RING VOICE MESSAGE GENERATING DEVICE AND METHOD OF AUTOMATIC ANSWERING TELEPHONE

CROSS-REFERENCE TO RELATED APPLICATION

This application makes reference to, incorporates the same herein, and claims all benefits accruing under 35 U.S.C. §119 from an application for Ring Voice Message Generating Device And Method Of automatic Answering Telephone earlier filed in the Korean Industrial Property Office on 13 Apr. 1995 and there duly assigned Serial No. 8697/1995.

BACKGROUND OF THE INVENTION

1. Technical Field

The present invention relates to a ring generating device and method for an automatic answering telephone, and more particularly to a device and method for generating an audible recorded voice message in lieu of a phone ring in response to reception of an incoming telephone call.

2. Background Art

Generally, telephone systems today are capable of automatically answering a telephone call and recording a caller'message accordingly. Some telephone systems such as disclosed, for example, in U.S. Pat. No. 4,608,458 for Automatic Telephone Answering Apparatus issued to Hashimoto, are further constructed to respond to an incoming telephone call by playing back a pre-recorded voice message greeting a caller and requesting for the caller'name for voice amplification via a loudspeaker so that the user can decide whether to answer the telephone call. An automatic telephone answering mechanism for such a telephone system is typically intended to play a pre-recorded voice message greeting a caller upon reception of an incoming telephone call and then to allow the user to play back a caller's message at some later time. The pre-recorded voice message is not intended to alert the user of an incoming telephone call. Such a telephone system usually alerts the user of an incoming telephone call by way of an electronic ringer for generating a ringing tone. Unfortunately, the standard ring of most telephone systems can be unpleasant, and in today office environments in which many telephone systems ring frequently, such ringing can often become irritating. Moreover, if the ringing pattern is identical for each telephone system in an office environment, for example, or even in a home with more than one phone line, it would be difficult for the user to discriminate which telephone system is ringing.

Thus, there is a need for a telephone system that allows each user to select a pleasant audible output to replace the standard ring tone in order to alert the user of an incoming telephone call. Conventional audible output device for a telephone system may be found, for example, in U. S. Pat. No. 4,480,153 for Musical-Output Adapter For Telephones issued to Festa, U.S. Pat. No. 4,856,055 for Controllable Telephone Annunciator issued to Schwartz, U.S. Pat. No. 5,099,513 for Integrated Circuit For Generating A Melody And Ring issued to Kim et al., and assigned to the same assignee of this application. In both Festa '153 and Kim '513, the telephone system is constructed with an audible output device that generates either a standard ring tone or a selected musical tone or melody in lieu of such a ring tone for pleasantly alerting the user of an incoming telephone call. In Festa '153, the audible output device is external to the telephone system. In Kim '513, by contrast, the audible output device is integrated into the telephone system. Similarly, in Schwartz '055, the output musical tones come from an integrated audible output device in twelve different pre-recorded melodies according to the season, holiday, or prevalent mood of the user. None is however constructed to allow the user to record his/her own pleasant voice message for announcement in lieu of a standard ring tone in response to an incoming telephone call.

More recently, there is an improved audible output device disclosed in U.S. Pat. No. 5,481,599 for Automated Audio Output Device For A Telephone Set issued to MacAllister et al., in which a personal voice message among a litany of other segments of music or sound effect is available for announcing an incoming telephone call in lieu of a standard ring tone. The audible output device of MacAllister '599 however contains a digital record and playback system controlled by a microprocessor for allowing the user to select a voice message or other audio segments pre-recorded in a plug-in memory device for announcement in lieu of a standard ring tone upon reception of an incoming telephone call until the ring signal is no longer detected or until the telephone handset is picked up by the user. Moreover, the audible output device of MacAllister '599 does not allow the user to choose the playing back of either his own self-made recorded voice message or a permanent voice message pre-recorded in an internal memory depending upon a mode set the user. Further, it is my observation that the audible output device of MacAllister '599 further requires complex and costly digital circuitry.

SUMMARY OF THE INVENTION

Accordingly, it is therefore an object of the present invention to provide an improved process and apparatus for generating ring voice messages.

It is another object to provide a simplified ring voice message generating device for use in an automatic answering telephone system and method for announcing an incoming telephone by way of a personalized voice message in lieu of a standard ring tone.

It is still another object to provide a ring voice massage generating device for use in an automatic answering telephone system and method for generating selectively a personalized voice message in a voice calling mode or a standard ring tone in a standard ring mode to inform a user of an incoming telephone call.

It is yet another object to provide a ring voice massage generating device for use in an automatic telephone answering system for allowing a user to set the telephone system for generating selectively a personalized voice message or a fixed standard voice message when the telephone system is in a voice calling mode to inform the user of an incoming telephone call.

These and other objects can be achieved according to the principles of the present invention with an improved ring voice message generating device for use in an automatic answering telephone system including a key input unit having alphanumeric keys or other function keys, for allowing a user to set the telephone system in a voice calling mode so that, upon reception of an incoming telephone call, a personalized voice message pre-recorded is announced in lieu of a standard ring tone to inform the user of such an incoming telephone call. Otherwise, the telephone system generates a standard ring tone if the voice calling mode is not set by the user. A ring detecting unit is connected to an incoming telephone line from a central exchange for detecting an incoming telephone call. An on/off hook switch is connected to the telephone system for forming a telephone conversation path when the user picks up the telephone handset to answer the incoming telephone call. A voice storing unit is provided for storing a personalized voice message for announcing the incoming telephone call when the telephone system is set in the voice calling mode. A ring generating unit is provided for generating a standard ring tone when the telephone system is not set in the voice calling mode. A mode selecting unit is provided for allowing the user to set the telephone system in one of a voice calling mode and a standard ring mode so that either a personalized voice message stored in the voice storing unit or a standard ring tone generated from the ring generating unit is announced through a speaker to inform the user of an incoming telephone call. A controller is also provided for controlling the entire operation of the ring voice generating device.

In addition, the key input unit of the ring voice message generating device constructed according to the present invention also allows the user to further set the telephone system in a self-made voice calling mode after the telephone system is set in the voice calling mode so that either a personalized voice message personally recorded by the user or a fixed voice message permanently recorded in the voice storing unit is announced in lieu of a standard ring tone to inform the user of an incoming call.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
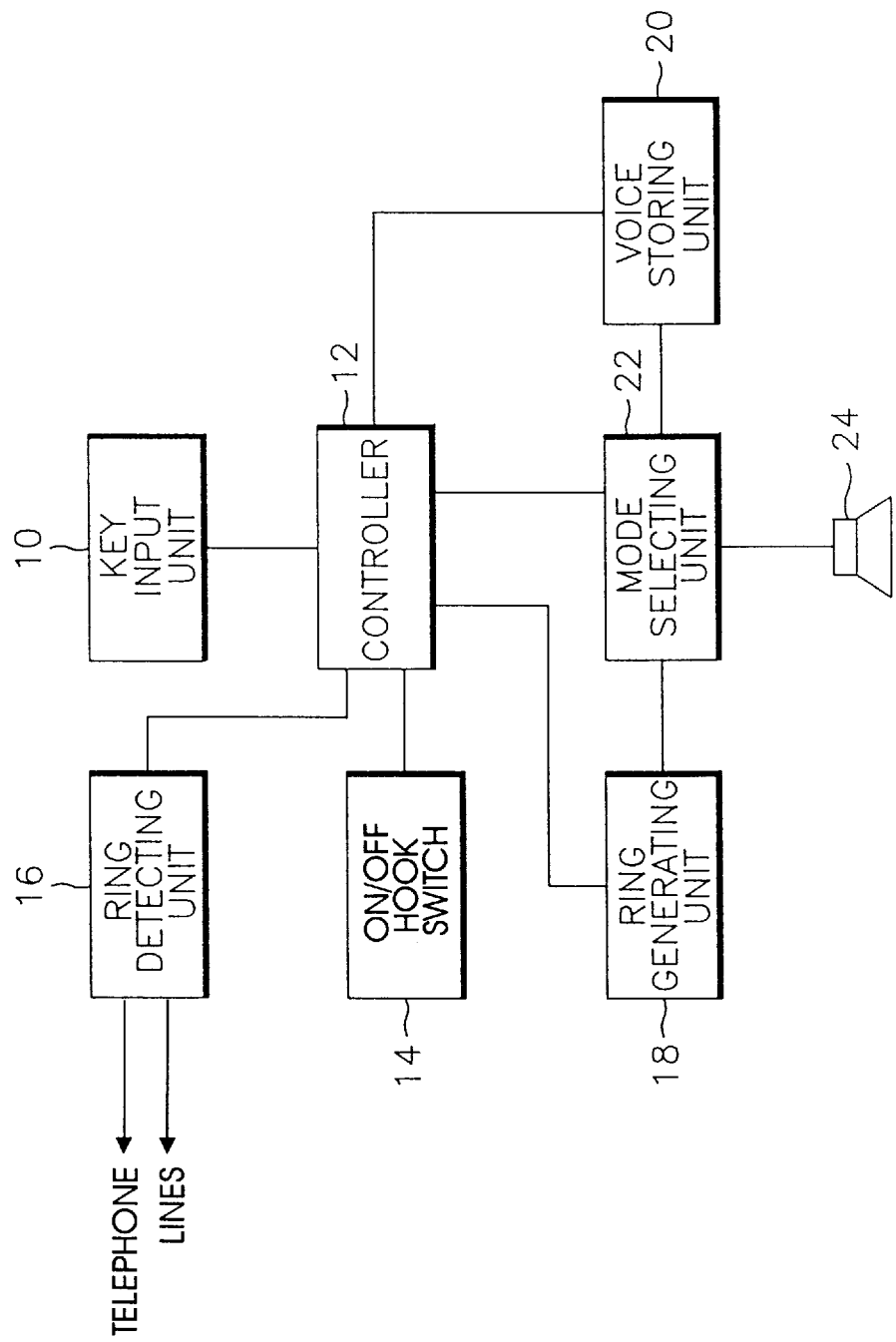
FIG. 1 is a block diagram illustrating an automatic answering telephone system constructed according to the principles of the present invention.

Referring now to the drawings and particularly to FIG. 1, which illustrates an automatic answering telephone constructed according to the principles of the present invention. The automatic answering telephone system of FIG. I includes a key input unit 10 having a plurality of alphanumeric functions keys including a voice calling mode key and a self-made calling mode key, a controller 12, an on/off hook switch 14, a ring detecting unit 16, a ring generating unit 18, a voice storing unit 20, a mode selecting unit 22 and a speaker 24. The key input unit 10 allows a user to press the voice calling mode key in order to set the telephone system in a voice calling mode so that, upon reception of an incoming telephone call, a voice message pre-recorded in the voice storing unit 20 is announced in lieu of a standard ring tone to inform the user of such an incoming telephone call. Otherwise, the telephone system allows the ring generating unit 18 to generate a standard ring tone to inform the user of an incoming telephone call if the voice calling mode is not set by the user. Ring detecting unit 16 is connected to an incoming telephone line from a central exchange and controller 12 for detecting an incoming telephone call. An on/off hook switch 14 is connected to the controller 12 for forming a telephone conversation path when the user picks up a telephone handset to answer the incoming telephone call. Voice storing unit 20 is connected to the controller 12 and the mode selecting unit 22, for storing a pre-recorded voice message for announcing the incoming telephone call when the telephone system is set in the voice calling mode. The voice storing unit 20 may come in a form of a voice synthesizing circuit or a cassette tape driving circuit having a voice memory capable of recording, erasing, and storing a single personalized voice message or a plurality of personalized voice messages. Ring generating unit 18 is connected to the controller 12 and the mode selecting unit 22, for generating a standard ring tone when the telephone system is not set in the voice calling mode. Mode selecting unit 22 is connected to the controller 12 for allowing the user to set the telephone system in one of a voice calling mode and a standard ring mode so that either a standard ring tone generated from the ring generating unit 18 or a pre-recorded voice message stored in the voice storing unit 20 in lieu of the standard ring tone is announced through a speaker 24 to inform the user of an incoming telephone call. A controller 12 is provided for controlling the entire operation of the automatic answering telephone system.

Controller 20 of the automatic answering telephone construction of FIG. 1, which typically is a 4-bit one-chip microprocessor, includes a read-only-memory (ROM) (not shown) and a random-access-memory (RAM) (not shown). When the ring detecting unit 16 detects an incoming telephone call, the mode selecting unit 22 under control of the controller 12 determines whether the telephone system is set in a voice calling mode. If the telephone system is set in the voice calling mode, the mode selecting unit 22 switches to the voice storing unit 20 and allows the pre-recorded voice message stored in the voice storing unit 20 to be announced in lieu of a standard ring tone through a speaker 24 for informing the user of an incoming telephone call. If, on the other hand, the telephone system is not set in the voice calling mode, i.e., when the telephone system is in a standard ring mode, the mode selecting unit 22 switches to the ring generating unit 18 and allows a standard ring tone generated from the ring generating unit 18 to be transmitted through the speaker 24.

The key input unit 10 also includes a self-made voice calling mode key which allows the user to set the telephone system in a self-made voice calling mode after the telephone system is set in the voice calling mode so that a personalized self-made voice message personally recorded by the user or a fixed voice message permanently recorded in the voice storing unit is announced in lieu of a standard ring tone to inform the user of an incoming call. The fixed voice message which is permanently recorded in the voice storing unit 20 may be phrased such as, for example,"You are wanted on the telephone. Please receive the telephone." By contrast, the self-made personalized voice message which is recorded by the user may be phrased such as, for example,"Please receive the telephone at a number xxxx", an announcement that may be most desirable in an office environment where many telephone systems are available in closed proximity.

Figure 2:
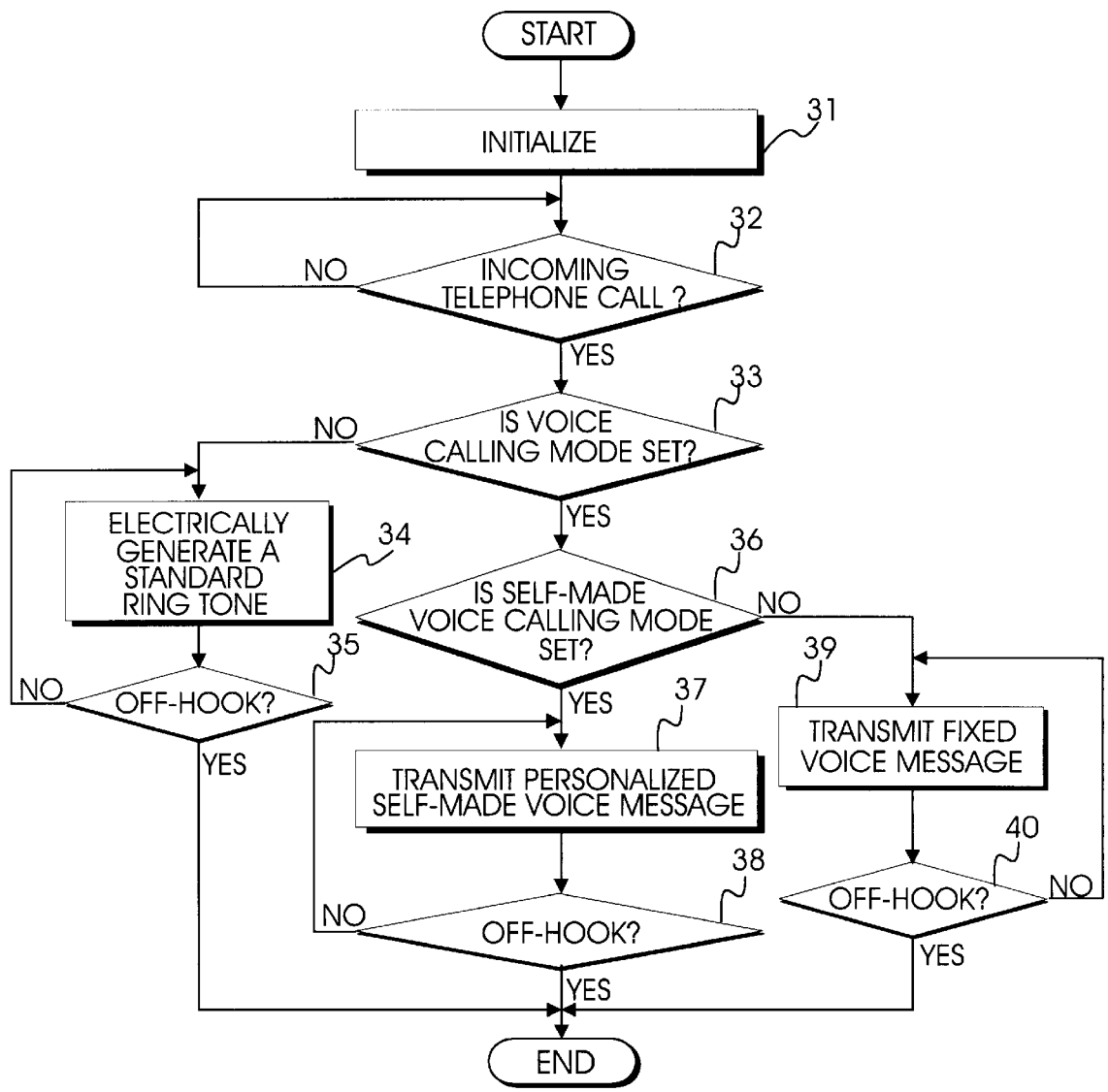
FIG. 2 is a control flow chart illustrating the announcement of one of a standard ring tone and a personalized voice message in lieu of the standard ring tone to inform a user of an incoming telephone call according to the present invention.

Turning now to FIG. 2 which is a control flow chart illustrating the announcement of one of a standard ring tone and a personalized voice message in lieu of the standard ring tone to inform a user of an incoming telephone call according to the present invention. Briefly, FIG. 2 contemplates that, upon detection of an incoming telephone call, determining whether a voice calling mode is set by a user. When the telephone system has not been set in the voice calling mode, a standard ring tone is announced to inform the user of an incoming telephone call. When the telephone system has been set in the voice calling mode however, determining whether the telephone system is additionally set in a self-made voice calling mode. If the telephone system has not been set in the self-made voice calling mode, a fixed voice message is transmitted for announcement in lieu of a standard ring tone to inform the user of an incoming telephone call. If, on the other hand, the telephone system has been set in the self-made voice calling mode, a personalized self-made voice message personally recorded by the user is transmitted for announcement in lieu of a standard ring tone to inform the user of an incoming telephone call.

An explanation on the operation of a preferred embodiment according the present invention will be in detail given with reference to FIGS. 1 and 2. Upon detection of an incoming telephone call from an incoming telephone line, the typical telephone system generates a standard ring tone to alert a user of an incoming telephone call. According to the construction of the present invention, however, the telephone system generates a pre-recorded voice message in lieu of a standard ring tone to inform the user that he/she is wanted on the telephone. To inform the incoming telephone call using a pre-recorded voice message, the fixed voice message and the self-made voice message are beforehand stored in the voice storing unit 20. The fixed voice message such as "You are wanted on the telephone. Please receive the telephone" is stored in a non-volatile memory and the personalized self-made voice message can be freely changed at any time by the intention of the user. Furthermore, a method of recording the personalized self-made voice message is the same as that of recording an out-going message in the conventional automatic answering telephone. As described above, after storing the voice message in the voice storing unit 20, the controller 12 sets the telephone system in an operating mode using a voice calling mode key and a self-made voice calling mode key provided by the key input unit 10.

As shown in FIG. 2, once power is on, the controller 12 initializes the telephone system at step 31. The controller 12 then determines whether the incoming telephone call is received from the incoming telephone line connected to the central exchange at step 32. When there is an incoming telephone call determined at step 32, the controller 12 determines whether the telephone system has been set by the user in the voice calling mode by way of key input unit 10 at step 33. If the telephone system has not been set by the user in the voice calling mode by way of the key input unit 10, the controller 12, in step 34, controls the mode selecting unit 22 and drives the ring generating unit 18 to generate a standard ring tone to the speaker 24. After the standard ring tone is generated for a predetermined period in which case, a typical answering device may be used to answer the telephone call by playing back a pre-recorded voice message greeting a caller and requesting for the caller's message, or until the on/off hook switch 14 determines that the user has picked up a telephone handset to answer the telephone call at step 35, the control process terminates.

If, on the other hand, the telephone system has been set in the voice calling mode, the controller 12 continues to determine whether the telephone system is further set by the user in a self-made voice calling mode by way of the key input unit 10 at step 36. When the telephone the self-made voice calling mode has not been set by the user by way of the key input unit 10 at step 36, the controller 12 accesses the voice storing unit 20, and concomitantly controls the mode selecting unit 22 to reproduce a fixed voice message permanently stored in a non-volatile memory section of the voice storing unit 20 such as, for example,"You are wanted on the telephone. Please receive the telephone" for announcement in lieu of a standard ring tone to inform the user of an incoming telephone call. After that, the controller 12 checks whether the on/off hook switch 14 is hooked off at step 40. Here, if the hook switch 14 has not been hooked off, the controller 12 continuously performs step 39 until either the user picks up the telephone handset to answer the incoming telephone call, or until expiration of a predetermined time at which time, as described above, a typical answering device may optionally be used to answer the incoming telephone call if desired.

If the telephone system has been set in the self-made voice calling mode at step 36, however, the controller 12 accesses the voice storing unit 20, and concomitantly controls the mode selecting unit 22 to reproduce a personalized self-made voice message personally recorded by the user in a volatile memory section of the voice storing unit 20 such as, for example,"Please receive the telephone at a number xxxx" for announcement in lieu of a standard ring tone to inform the user of an incoming telephone call at step 37. Here, it should be noted that the personalized self-made voice message can be freely changed, and a new, different self-made voice message can be registered or recorded over the previous self-made voice message at any time by the user should he/she desire for such a change. The technique for registering the old and new personalized self-made voice message is the same as that of the registration of an out-going message in a typical automatic answering device in which a recorded voice message greeting a caller is played back to answer an incoming telephone call and request for the caller's message when the user is not available to answer the incoming telephone call.

After the controller 12 controls the reproduction of a personalized self-made voice message personally recorded by the user in the voice storing unit 20 for announcement in lieu of a standard ring tone to inform the user of an incoming telephone call at step 37, the controller 12 again checks whether the on/off hook switch 14 is hooked off at step 38 indicating that the user has picked up the telephone handset to answer the incoming telephone call. If the on/off hook switch is not hooked off at step 38, the controller 12 again controls the announcement of the personalized self-made voice message stored in the voice storing unit 20 until either the user picks up the telephone handset to answer the incoming telephone call, or until expiration of a predetermined time at which time, again as described above, a typical answering device may optionally be used to answer the incoming telephone call if desired.

As may be apparent from the foregoing, in the ring voice message generating device and method of the automatic answering telephone including various voice messages, the user can select a desirable voice message of the various voice messages and the selected voice message can be transmitted without generating the standard ring tone upon reception of an incoming telephone call. Therefore, there are advantages in that the calling disturbance phenomenon frequently occurring in a busy office environment where many telephone systems are operating at the same time, may be reduced and that the efficiency of such a telephone system may be improved by the early recognition of the calling of the telephone and answering the calling thereof.

While there have been illustrated and described what are considered to be preferred embodiments of the present invention, it will be understood by those skilled in the art that various changes and modifications may be made, and equivalents may be substituted for elements thereof without departing from the true scope of the present invention. For example, In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A ring voice message generating device in an automatic answering telephone system, comprising:

key input means including a voice calling mode key and a self-made voice calling mode key;

control means for allowing a user to set the telephone system in the voice calling mode in response to input of said voice calling mode key and in the self-made voice calling mode key in response to input of said self-made voice call mode key, for controlling generation of one of a standard ring tone and a pre-recorded voice message for announcement to inform a user of an incoming call;

ring detecting means connected to an incoming telephone line from a central exchange, for detecting the incoming telephone call;

hook switch means for forming a telephone conversation path when the user picks up a telephone handset to answer the incoming telephone call;

voice storing means for storing a plurality of pre-recorded voice messages;

ring generating means for generating the standard ring tone when the telephone system has not been set in the voice calling mode; and mode selecting means for selectively enabling said voice storing means to reproduce one of a personalized self-made voice message and a fixed voice message as said pre-recorded voice message for announcement of the incoming telephone call in dependence upon whether the telephone system is set in the self-made voice calling mode after the telephone system has been set in the voice calling mode, and for alternatively enabling said ring generating means to generating the standard ring tone for announcement of the incoming telephone call when the telephone system has not been set in the voice calling mode.

2. The ring voice generating device of claim 1, further comprising a speaker for announcing one of said standard ring tone and said pre-recorded voice message selectively outputted from said mode selecting means.

3. A ring voice message generating method in an automatic answering telephone system having a memory for storing a fixed voice message and a personalized replaceable voice message, said ring voice message generating method comprising the steps of:

permitting a user to set the telephone system in one of a voice calling mode and a self-made voice calling mode from a normal mode of operation;

determining whether the telephone system is set in the voice calling mode from the normal mode of operation, upon reception of an incoming telephone call;

when the telephone system is not set in the voice calling mode from the normal mode of operation, generating a standard ring tone to inform the user of an incoming telephone call;

when the telephone system is set in the voice calling mode from the normal mode of operation, determining whether the telephone system is set in the self-made voice calling mode; and reproducing the personalized replaceable voice message recorded in said memory for announcement in lieu of said standard ring tone to inform the user of an incoming telephone call, when the telephone system is set in the self-made voice calling mode, and alternatively reproducing the fixed voice message recorded in said memory for announcement in lieu of said standard ring tone to inform the user of an incoming telephone call, when the telephone system is not set in the self-made voice calling mode.

4. The ring voice message generating method of claim 3, further comprised of permitting the user to record the personalized replaceable voice message in said memory during a recording mode.

5. The ring voice message generating method of claim 4, further comprised of the telephone system being set in the voice calling mode in response to the user's input of a voice calling mode key from a key input unit and in the self-made voice calling mode in response to the user's input of a self-made voice calling key form said key input unit.

6. A telephone system, comprising:

a memory having a non-volatile section recording a fixed voice message, and a volatile section recording a personalized replaceable voice message;

input means for allowing a subscriber to set the telephone system in a voice calling mode enabling the telephone system to generate a recorded voice message representing one of said fixed voice message and said personalized replaceable voice message for announcement in lieu of a standard ring tone of an incoming telephone call, and for allowing the subscriber to set the telephone system in a self-made voice calling mode enabling the telephone system to generate said personalized replaceable voice message as said recorded voice message for announcement in lieu of a standard ring tone of the incoming telephone call;

a controller for controlling generation of one of said standard ring tone and said recorded voice message for announcement, upon detection of the incoming telephone call; and a mode selector for selecting reproduction of one of said fixed voice message and said personalized replaceable message as said pre-recorded voice message for announcement of the incoming telephone call in dependence upon whether the telephone system is set in the self-made voice calling mode after the telephone system has been set in the voice calling mode, and for alternatively enabling generation of the standard ring tone for announcement of the incoming telephone call when the telephone system has not been set in the voice calling mode.

7. The telephone system of claim 6, further comprising:

a ring detector connected to an incoming telephone line from a central exchange, for detecting the incoming telephone call;

a hook switch for forming a telephone conversation path when the subscriber picks up a telephone handset to answer the incoming telephone call; and a ring generator for generating the standard ring tone, when the telephone system has not been set in the voice calling mode.

8. The telephone system of claim 7, further comprised of said input means corresponding to a key input unit comprising at a first calling mode key for permitting the subscriber to set the telephone system in the voice calling mode, and a second calling mode key for permitting the subscriber to set the telephone system in the self-made voice calling mode.

9. The telephone system of claim 8, further comprising:

a speaker for announcing one of said standard ring tone and said recorded voice message selectively enabled from said mode selector under the control of said controller.

10. The telephone system of claim 9, further comprised of said controller controlling the announcement of said personalized replaceable voice message recorded in the volatile section of said memory until the subscriber user picks up the telephone handset to answer the incoming telephone call.

11. The telephone system of claim 10, further comprised of said controller controlling the announcement of said fixed voice message recorded in the non-volatile section of said memory until expiration of a predetermined time period.

12. The telephone system of claim 9, further comprised of said controller controlling the announcement of said fixed voice message recorded in the non-volatile section of said memory until the subscriber user picks up the telephone handset to answer the incoming telephone call.

13. The telephone system of claim 12, further comprised of said controller controlling the announcement of said fixed voice message recorded in the non-volatile section of said memory until expiration of a predetermined time period.

14. A telephone system, comprising:

a key input unit comprising a plurality of discrete keys including a first calling mode key and a second calling mode key;

a controller for setting the telephone system in a first calling mode in response to input of said first calling mode key and in a second calling mode in response to input of said second calling mode key, for controlling generation of one of a standard ring tone and a pre-recorded voice message for announcement to inform a user of an incoming call;

a memory for storing a plurality of pre-recorded voice messages;

a ring generator for generating the standard ring tone when the telephone system has not been set in the first calling mode; and a mode selector for selectively reproducing one of a personalized voice message and a fixed voice message as said pre-recorded voice message for announcement of the incoming call in dependence upon whether the telephone system is set in the second calling mode after the telephone system has been set in the first calling mode, and for alternatively enabling said ring generator to generate the standard ring tone for announcement of the incoming telephone call when the telephone system has not been set in the first calling mode.

15. The telephone system of claim 14, further comprising a speaker for announcing one of said standard ring tone and said pre-recorded voice message selectively reproduced from said mode selector.

16. The telephone system of claim 14, further comprised of said controller controlling the announcement of said personalized voice message recorded in said memory until the subscriber user picks up the telephone handset to answer the incoming telephone call.

17. The telephone system of claim 14, further comprised of said controller controlling the announcement of said fixed voice message recorded in said memory until expiration of a predetermined time period.

18. The telephone system of claim 14, further comprised of said controller controlling the announcement of said fixed voice message recorded in said memory until the subscriber user picks up the telephone handset to answer the incoming telephone call.

* * * * *